US008953088B2

(12) United States Patent  
Pavithran et al.

(10) Patent No.: US 8,953,088 B2  
(45) Date of Patent: Feb. 10, 2015

(54) LOW PROFILE CAMERA MODULE PACKAGING

(76) Inventors: Prebesh Pavithran, Bukit Mertajam (MY); Yeow Thiam Ooi, Butterworth (MY); Khen Ming Goh, Mutiara Damansara (MY); Kumareson Darmalingam, Lengkok Angsana (MY)

( * ) Notice: Subject to any disclaimer, the term of this patent is extended or adjusted under 35 U.S.C. 154(b) by 71 days.

(21) Appl. No.: 13/403,610

(22) Filed: Feb. 23, 2012

(65) Prior Publication Data

US 2012/0242883 A1 Sep. 27, 2012

Related U.S. Application Data

(60) Provisional application No. 61/446,163, filed on Feb. 24, 2011.

(51) Int. Cl.  
*H04N 5/225* (2006.01)

(52) U.S. Cl.  
CPC .................................. *H04N 5/2257* (2013.01)  
USPC .............. 348/340; 438/64; 348/294; 348/374

(58) Field of Classification Search  
USPC .................. 348/340, 335, 374, 294; 250/216; 438/64; 257/433  
See application file for complete search history.

(56) References Cited

U.S. PATENT DOCUMENTS

| | | | | |
|---|---|---|---|---|
| 4,555,636 A | * | 11/1985 | Fujisawa et al. | ........... 250/208.1 |
| 2003/0128442 A1 | * | 7/2003 | Tanaka et al. | ................. 359/819 |
| 2004/0222352 A1 | * | 11/2004 | Nishizawa | ................. 250/208.1 |
| 2005/0264677 A1 | * | 12/2005 | Uchida | .......................... 348/340 |
| 2007/0040932 A1 | | 2/2007 | Chen | |
| 2007/0241273 A1 | * | 10/2007 | Kim et al. | ..................... 250/239 |
| 2008/0028856 A1 | | 2/2008 | Kikuiri et al. | |
| 2009/0122178 A1 | * | 5/2009 | Kwon et al. | .................. 348/340 |
| 2010/0025791 A1 | | 2/2010 | Ogawa et al. | |
| 2010/0118420 A1 | | 5/2010 | Deng et al. | |
| 2011/0032398 A1 | * | 2/2011 | Lenchenkov | ................. 348/294 |
| 2011/0043686 A1 | * | 2/2011 | Chang | ........................... 348/374 |

FOREIGN PATENT DOCUMENTS

WO WO 2012-116275 A2 8/2012

OTHER PUBLICATIONS

*Ultra Thin Flexible Glass Substrates*; Plichta et al., Materials Research Society Symposium Proceedings, vol. 769, Copyright 2003, Materials Research Society.  
PCT App. No. PCT/US2012/026501, International Search Report and Written Opinion dated Sep. 14, 2012.  
PCT App. No. PCT/US2012/026501, International Preliminary Report on Patentability dated Sep. 6, 2013.

* cited by examiner

*Primary Examiner* — Paul Berardesca  
(74) *Attorney, Agent, or Firm* — Larry E. Henneman, Jr.; Gregory P. Gibson; Henneman & Associates, PLC

(57) ABSTRACT

A camera module including an image sensor and a circuit substrate that are each attached to a bottom surface of a glass substrate. The image sensor is positioned between the circuit substrate and the glass substrate. This arrangement allows passive components normally associated with the image sensor to be mounted to a top surface of the glass substrate rather than to the image sensor, thus reducing the necessary size of the top surface of the image sensor, which in turn can reduce the overall size of the image sensor. A lens assembly, including a housing and a lens, is attached to the circuit substrate to position the image sensor and the glass substrate within a cavity provided in the housing.

15 Claims, 2 Drawing Sheets

LOW PROFILE CAMERA MODULE PACKAGING

CROSS REFERENCE

This application is the non-provisional of U.S. Provisional Pat. Appl. No. 61/446,163, filed Feb. 24, 2011, entitled "LOW PROFILE CAMERA MODULE PACKAGING," which is hereby incorporated by reference into this application.

BACKGROUND

Digital camera modules are currently being incorporated into a variety of host devices such as, for example, cellular telephones, personal data assistants (PDAs), computers, etc. Such host devices are becoming increasingly more compact and, therefore, permitting less and less space for camera module form factors. Accordingly, host device manufacturers prefer digital camera modules to be small, so that they can be incorporated into the host device without increasing the overall size of the host device. Of course, host device manufacturers also prefer camera modules that capture images of the highest possible quality.

A conventional digital camera module generally includes an integrated image capture device (ICD), passive components, a printed circuit board (PCB), a housing, and a lens. Typically, the ICD and passive components are mounted on the PCB, and then the housing is attached to the PCB so that the ICD and passive components are covered by the bottom of the housing. Then, the lens is mounted on the opposite end of the housing to focus incident light onto an image capture surface of the ICD.

One problem with conventional camera module designs is that they have a relatively large footprint and, therefore, occupy a significant amount of real-estate area on the host device. This is because the base of the housing has to be large enough to cover the ICD and the passive components mounted around the ICD. Further, conventional camera modules typically cannot satisfy small form factor requirements without sacrificing image quality.

It is against this background that a camera module that can satisfy stricter form factor requirements and capture high quality images has been developed.

SUMMARY

The disclosed camera module overcomes the issues associated with the prior art by providing a novel design for a low profile camera module package. Such a camera module includes a circuit substrate having a top side and a bottom side; a lens assembly including a housing and a lens, wherein the housing is attached to the top side of the circuit substrate; a glass substrate having a top side and a bottom side, wherein the bottom side of the glass substrate is attached to the top side of the circuit substrate; and an image sensor having a top side and a bottom side, wherein the top side of the image sensor is attached to the bottom side of the glass substrate.

The lens housing may have a cavity formed therein and the glass substrate and image sensor are positioned inside of the cavity. The glass substrate may be attached to the circuit substrate with a plurality of SMT bumps. The SMT bumps may provide both a mechanical attachment and an electrical attachment between the glass substrate and the circuit substrate. The glass substrate may be attached to the image sensor with a plurality of stud bumps. The stud bumps may provide both a mechanical attachment and an electrical attachment between the glass substrate and the image sensor. The camera module may further include one or more passive components attached to the top side of the glass substrate in a region of the glass substrate opposite from either the attachment of the glass substrate to the circuit substrate or to the image sensor. The glass substrate may include circuitry on the top side thereof and one or more conductive paths through the substrate to connect the circuitry on the top side to an electrical attachment point on the bottom side. The circuitry may include transparent conductive material. One or more of the conductive paths may include a via with a conductive material therein. The conductive material may include tungsten. The camera module may further include an IR filter to reduce the amount of IR light energy that reaches the image sensor. The IR filter may be located on the top surface of the glass substrate.

A process for producing a camera module includes attaching a top surface of an image sensor to a bottom surface of a glass substrate; attaching a top surface of a circuit substrate to the bottom surface of the glass substrate so that the image sensor is then positioned between the glass substrate and the circuit substrate; and attaching a lens assembly having an internal cavity to the top surface of the circuit substrate so that the glass substrate and the image sensor are positioned within the internal cavity.

The method may further include attaching one or more passive components to a top surface of the glass substrate at some point in the process. The attachment of the image sensor to the glass substrate may include the use of solder bumps. The attachment of the circuit substrate to the glass substrate may include the use of solder bumps. The solder bumps connecting the image sensor to the glass substrate may be smaller than the solder bumps connecting the circuit substrate to the glass substrate. The lens assembly may include a housing and a lens.

DETAILED DESCRIPTION

Figure 1:
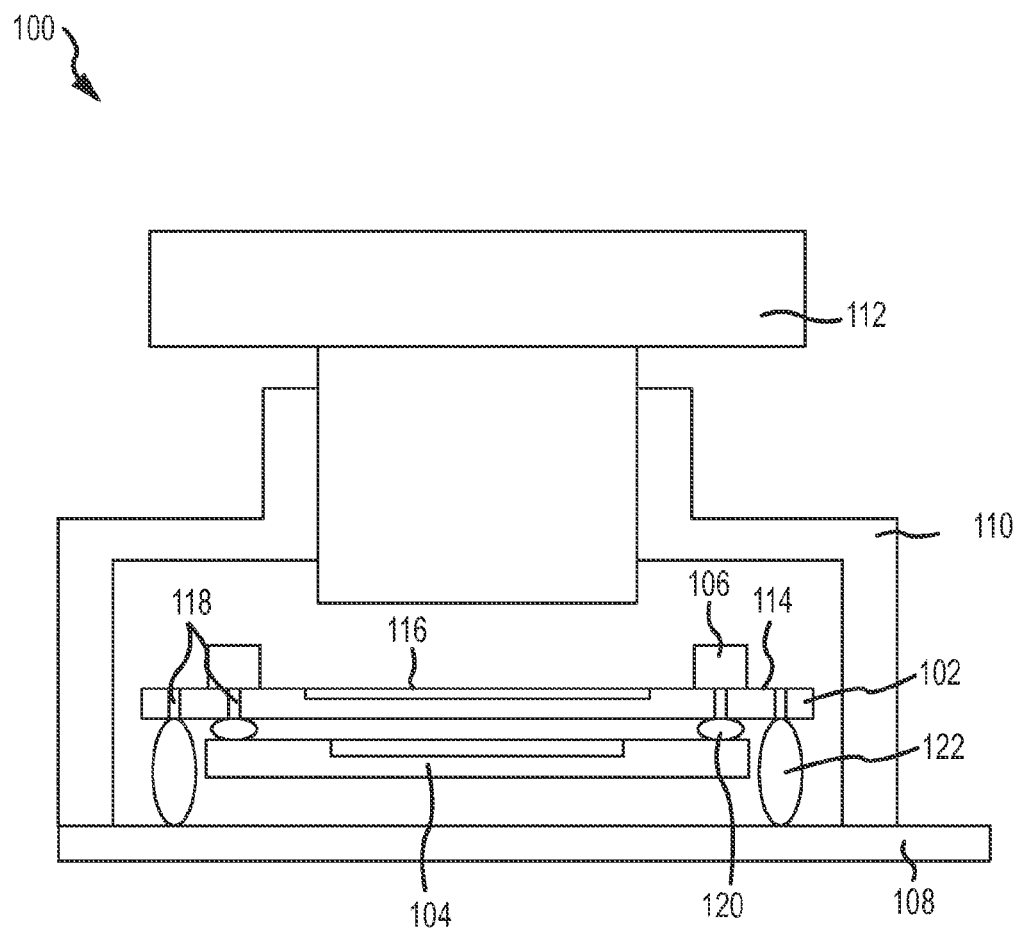
FIG. 1 is a sectional view of a camera module.

While the embodiments of the present invention are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims.

FIG. 1 is cross-sectional view of a low profile camera module 100 that includes a transparent glass substrate 102, an image sensor 104 (e.g., CMOS chip), a set of passive components 106, a circuit substrate 108, a housing 110, and a lens 112. The image sensor 104 and the passive components 106 are mounted on opposite sides of substrate 102 (bottom and top, respectively), the housing 110 and the substrate 102 are mounted on the top surface of circuit substrate 108, and the lens 112 is mounted to the housing 110. Together, the lens 112 and housing 110 may be referred to as a lens assembly. While top and bottom are used herein, the same meaning could be obtained by referring to opposite sides A and B.

The glass substrate 102 includes transparent circuitry 114 (e.g., composed of Indium Tin Oxide (ITO)) on a top side thereof, a selective infrared coating 116, and a plurality of vias 118. In this particular embodiment, the glass substrate 102 prevents debris from accumulating on the image sensor 104. The transparent circuitry 114 is formed on the top surface of the glass substrate 102 via ITO technology commonly used in manufacturing liquid crystal display (LCD) devices. Infrared (IR) coating 116 is formed on the top surface of the glass substrate 102 so as to filter infrared light from the light that is focused onto image sensor 104 by the lens 112. Optionally, IR coating 116 could be omitted and an IR filter could be incorporated into lens 112, or the IR filter could be located at another appropriate location in the camera module. The vias 118 may be, for example, plated tungsten vias formed through the glass substrate 102 using technology developed by SCHOTT/NEC.

Figure 2:
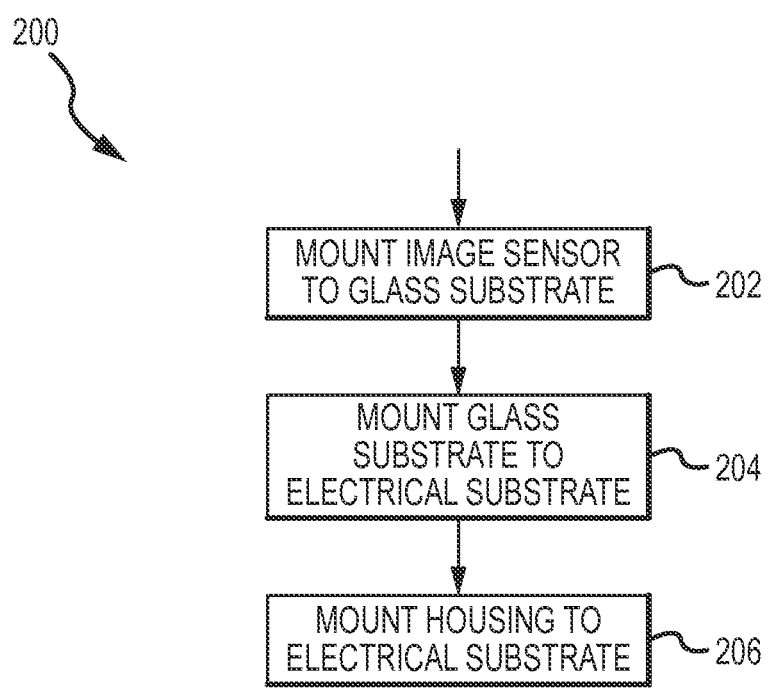
FIG. 2 is a flow chart of a process for producing the camera module.

FIG. 2 shows a process 200 for producing the camera module 100. The image sensor 104 is flip chip mounted (202) to the bottom surface of the glass substrate 102 such that electrical contacts (not shown) formed on the top surface of image sensor 104 are electrically coupled to ITO circuitry 114 by vias 118. For example, a stud bump 120 is formed on each electrical contact of image sensor 104 and then image sensor 104 is flip chip by some suitable means (e.g., thermocompression bonding, thermosonic bonding, etc.). The contacts of image sensor 104 could be connected directly to vias 118 and/or indirectly to vias 118 by, for example, additional ITO circuitry formed on the bottom surface of substrate.

One example of a technique for forming the stud bumps 120 may include using gold wire to form a Free Air Ball (FAB) of gold. This may be achieved with what is known as Electronic Flame Off where a spark is caused to jump between the gold wire and the contact pad with a high current. The high voltage spark melts the end of the gold wire and forms a gold ball. A capillary is formed on the contact pad with ultrasonic energy, force, and high temperature. The wire is then cut from the ball, just above the surface of the ball.

After the image sensor 104 is flip chip bonded to the glass substrate 102, the glass substrate 102 is mounted (204) and electrically coupled to the electrical substrate 108 via surface mount technology (SMT) wherein the electrical connection is facilitated by a set of SMT bumps 122, which are larger than the previously-described stud bumps 120. One example of a technique for forming the SMT bumps 122 is that a solder ball is first dipped into flux for deoxidization purposes, and then solder paste is printed (or otherwise dispensed) onto the gold contact pads. The solder balls are then attached to the gold contact pads and then they are reflowed by a reflow oven to partially collapse the solder balls, thus forming SMT bumps 122.

After the SMT process of attaching the glass substrate 102 to the electrical substrate 108 is performed, the passive components 104 are directly mounted on the top surface of the glass substrate 102 via passive on glass (POG) processes similar to passive on die (POD) processes. Accordingly, the passive components 106 are electrically coupled to the ITO circuitry 114 and/or vias 118. The housing 110 is then mounted (206) to the electrical substrate 108. It should be recognized that by positioning the passive components 106 above the image sensor 104 on a different substrate rather than around and on the same substrate of the image sensor 104, the inner perimeter of the base of the housing 110 can be smaller than that of conventional camera modules that have passive components positioned around the image sensor. Accordingly, the overall footprint of the camera module 100 can have less area than conventional camera modules and, therefore, occupy less host device real estate.

The circuit substrate 108 can be suitable type of circuit substrate including, but not limited to, a rigid flex printed circuit (RFPC), a flexible printed circuit (FPC), PCB, glass circuit substrate, etc. While it is disclosed above that the passive components 106 are attached to the top of the glass substrate 102 between process steps 204 and 206, it is also possible that the passive components 106 could be attached to the glass substrate 102 between process steps 202 and 204, or before process step 202.

It should be understood that the particular focusing mechanism of camera module 100 is not particularly important herein and is, therefore, not presented in detail. Indeed, any suitable focusing means can be used without deviating from the concepts taught herein. That is, these techniques can be practiced with both fixed focus camera modules and autofocus camera modules. For example, the novel features of camera module 100 can be implemented on video graphics array one megapixel fixed focus (VGA/1MP FF) camera modules.

While the embodiments of the invention have been illustrated and described in detail in the drawings and foregoing description, such illustration and description is to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A camera module, comprising:
a circuit substrate having a top side and a bottom side;
a lens assembly including a housing and a lens, wherein the housing is attached to the top side of the circuit substrate;
a glass substrate having a top side, a bottom side, and circuitry, wherein the bottom side of the glass substrate is attached to the top side of the circuit substrate with a plurality of SMT bumps;
one or more passive components attached to the glass substrate and being electronically coupled to the circuitry of the glass substrate; and
an image sensor having a top side and a bottom side, wherein the top side of the image sensor is attached to the bottom side of the glass substrate and is electronically coupled to the circuitry of the glass substrate; and wherein
the circuitry of the glass substrate provides a connection between the image sensor and the one or more passive components apart from the circuit substrate; and
the SMT bumps provide both a mechanical attachment and an electrical attachment between the glass substrate and the circuit substrate.

2. A camera module as defined in claim 1, wherein the lens housing has a cavity formed therein and the glass substrate and image sensor are positioned inside of the cavity.

3. A camera module as defined in claim 1, wherein the glass substrate is attached to the image sensor with a plurality of stud bumps.

4. A camera module as defined in claim 3, wherein the stud bumps provide both a mechanical attachment and an electrical attachment between the glass substrate and the image sensor.

5. A camera module as defined in claim 1, wherein the one or more passive components are attached to the top side of the glass substrate at one or more locations opposite where the glass substrate is attached to the circuit substrate or where the glass substrate is attached to the image sensor.

6. A camera module as defined in claim 1, wherein the glass substrate includes the circuitry on the top side thereof and one or more conductive paths through the substrate to connect the circuitry on the top side to an electrical attachment point on the bottom side.

7. A camera module as defined in claim 6, wherein the circuitry includes transparent conductive material.

8. A camera module as defined in claim 6, wherein one or more of the conductive paths includes a via with a conductive material therein.

9. A camera module as defined in claim 8, wherein the conductive material includes tungsten.

10. A camera module as defined in claim 1, further including an IR filter to reduce the amount of IR light energy that reaches the image sensor.

11. A camera module as defined in claim 10, wherein the IR filter is located on the top surface of the glass substrate.

12. A process for producing a camera module, comprising:
providing a glass substrate having a top surface, a bottom surface, and circuitry;
attaching a top surface of an image sensor to the bottom surface of the glass substrate such that the image sensor is electronically coupled to the circuitry of the glass substrate;
attaching a top surface of a circuit substrate to the bottom surface of the glass substrate using a plurality of SMT bumps so that the image sensor is then positioned between the glass substrate and the circuit substrate;
attaching one or more passive components to the glass substrate such that the one or more passive components are electronically coupled to the circuitry of the glass substrate; and
attaching a lens assembly having a housing, a lens, and an internal cavity to the top surface of the circuit substrate so that the glass substrate and the image sensor are positioned within the internal cavity; and wherein
the circuitry of the glass substrate provides a connection between the image sensor and the one or more passive components apart from the circuit substrate; and
the SMT bumps provide both a mechanical attachment and an electrical attachment between the glass substrate and the circuit substrate.

13. A method as defined in claim 12, wherein the one or more passive components are attached to the top surface of the glass substrate.

14. A method as defined in claim 12, wherein the attachment of the image sensor to the glass substrate includes the use of stud bumps.

15. A method as defined in claim 14, wherein:
the stud bumps connecting the image sensor to the glass substrate are smaller than the SMT bumps connecting the circuit substrate to the glass substrate; and
the SMT bumps connecting the circuit substrate to the glass substrate are sized to retain a bottom surface of the image sensor above the top surface of the circuit substrate.

* * * * *